US012595950B2

(12) United States Patent
Vijayan et al.

(10) Patent No.: US 12,595,950 B2
(45) Date of Patent: Apr. 7, 2026

(54) ETHYLENE FILTRATION SYSTEM FOR A REFRIGERATOR

(71) Applicant: Haier US Appliance Solutions, Inc., Wilmington, DE (US)

(72) Inventors: Vineeth Vijayan, Louisville, KY (US); Stephanos Kyriacou, Louisville, KY (US)

(73) Assignee: Haier US Appliance Solutions, Inc., Wilmington, DE (US)

( * ) Notice: Subject to any disclaimer, the term of this patent is extended or adjusted under 35 U.S.C. 154(b) by 231 days.

(21) Appl. No.: 18/358,313

(22) Filed: Jul. 25, 2023

(65) Prior Publication Data
US 2025/0035363 A1 Jan. 30, 2025

(51) Int. Cl.
*F25D 17/04* (2006.01)
*A23B 2/721* (2025.01)

(52) U.S. Cl.
CPC ............ *F25D 17/042* (2013.01); *A23B 2/721* (2025.01)

(58) Field of Classification Search
CPC ..... A23B 2/721; F25D 17/042; F25D 25/025; F25D 2317/041
See application file for complete search history.

(56) References Cited

U.S. PATENT DOCUMENTS

| | | | |
|---|---|---|---|
| 11,340,011 B2 | 5/2022 | Kelly | |
| 11,859,894 B2 * | 1/2024 | Yu ............................ | F25B 39/02 |
| 2014/0342064 A1 * | 11/2014 | Arrigo ................... | A23B 7/055 62/449 |
| 2022/0258093 A1 | 8/2022 | Malausa et al. | |

FOREIGN PATENT DOCUMENTS

| | | |
|---|---|---|
| CN | 216557876 U | 5/2022 |
| KR | 20050116754 A | 12/2005 |

OTHER PUBLICATIONS

Whirlpool, "FreshFlow Produce Preserver Refill", Whirlpool 2023, Model 3W10346771A, Retrieved from Internet: https://www.whirlpool.com/accessories/kitchen-accessories/refrigerator/p.freshflow-produce-preserver-refill.w10346771a.html.

* cited by examiner

*Primary Examiner* — Sharon Pregler
(74) *Attorney, Agent, or Firm* — Dority & Manning, P.A.

(57) ABSTRACT

A refrigerator appliance comprising a fresh food storage chamber and a filter system for ethylene in the fresh food storage chamber is disclosed. The fresh food storage chamber includes a ventilation system comprising a fan assembly fluidly coupled to an air supply vent and an air return vent to urge an air flow along an air flow path. A removable air filter assembly for ethylene gas, the filter assembly including a housing and a chemisorption filter contained in the housing, is removably fixed in the air flow path.

13 Claims, 7 Drawing Sheets

ETHYLENE FILTRATION SYSTEM FOR A REFRIGERATOR

FIELD OF THE INVENTION

The present disclosure relates generally to a filter system for refrigerators, more particularly to a filter system for removal of ethylene gas from refrigerator cabinet air.

BACKGROUND OF THE INVENTION

Refrigerators typically have systems to remove odors or other gases from cabinet air. Known systems use filters and filter media that absorb gases based on the adsorption principle of physisorption.

Ethylene is a gas produced by fresh produce as it matures and initiates and accelerates the ripening process. Typically, produce is refrigerated to slow the ripening process and preserve the fresh produce from ripening to the point of spoilage. Accordingly, the presence of ethylene gas in a refrigerated compartment storing fresh produce is undesirable. However, typical refrigerator filters using physisorption are largely ineffective in capturing ethylene gas. In some cases, a sachet of suitable ethylene absorbing materials may be placed in a storage compartment to slow the ripening process for produce stored in the compartment. However, sachets in isolated bins are effective in local removal of ethylene but ineffective in removal of ethylene from the refrigerator cabinet in general. Additionally, typical ethylene absorbing materials are known to be chemically reactive and irritating to skin if direct contact occurs, creating a risk in handling sachets.

Accordingly, improvements to ethylene filter systems for refrigerators may be desirable.

BRIEF DESCRIPTION OF THE INVENTION

Aspects and advantages of the invention will be set forth in part in the following description, may be apparent from the description, or may be learned through practice of the invention.

In one exemplary aspect, a refrigerator appliance defining mutually perpendicular vertical, lateral, and transverse directions is disclosed, the refrigerator appliance comprising a cabinet comprising a first side wall laterally spaced from a second side wall, a top wall vertically spaced above a bottom wall, and a back wall defining a fresh food storage area. The refrigerator appliance further includes a fresh food storage chamber ventilation system comprising a fan assembly fluidly coupled to an air supply vent and an air return vent, wherein the fan assembly urges an air flow along an air flow path from the supply vent to the return vent. The refrigerator appliance further includes a removable air filter assembly comprising a housing and a chemisorption filter media contained in the housing, the filter assembly removably fixed in the air flow path.

In another example aspect, a removable refrigerator air filter assembly is disclosed. The removable air filter assembly comprises a housing comprising one or more walls defining an internal volume, at least one of the walls defining a plurality of perforations, and a chemisorption filter media disposed within the volume, the chemisorption filter media secured against removal from the volume, wherein the perforations facilitate fluid communication between the filter media and an external air flow.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

Figure 1:
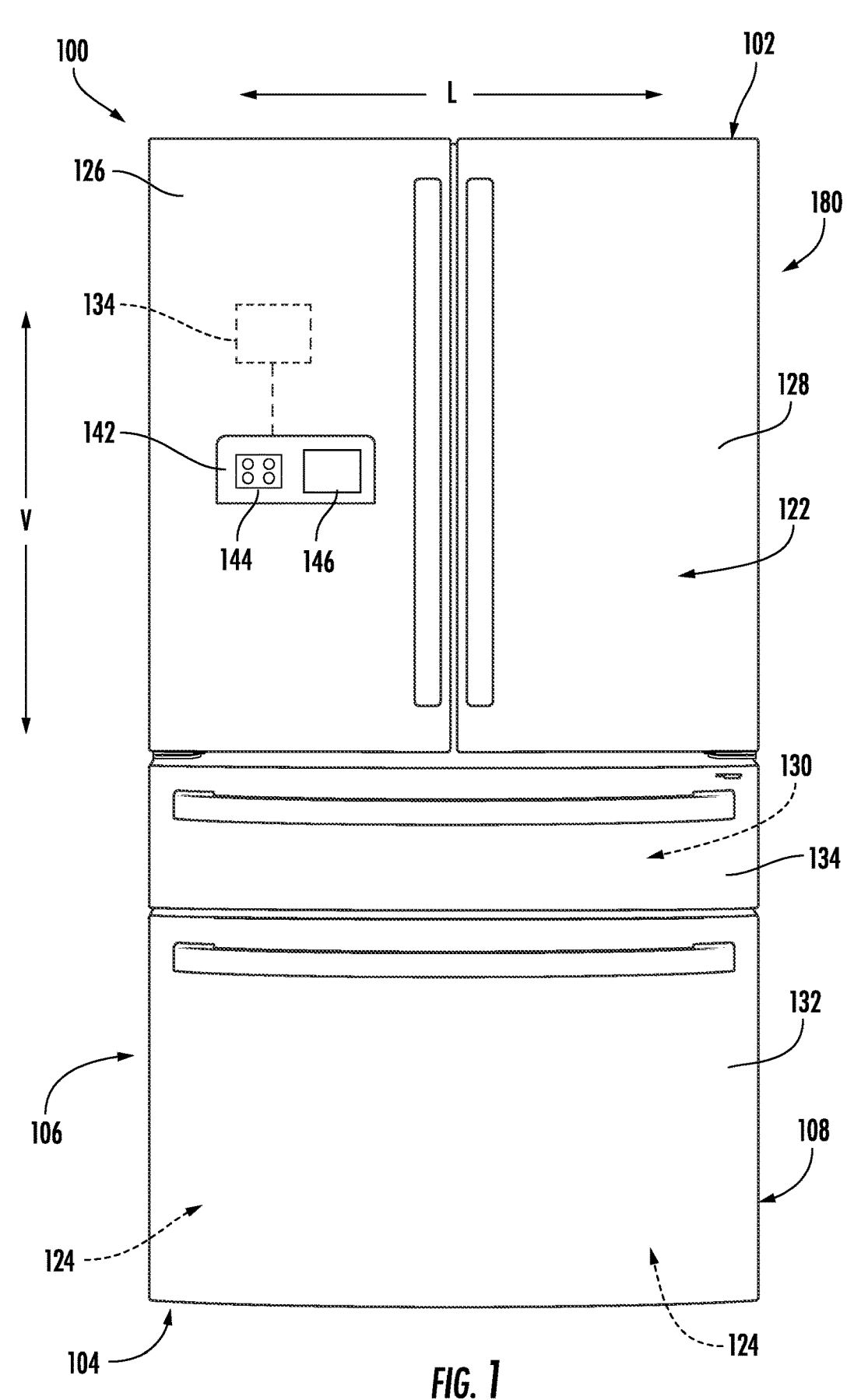
FIG. 1 provides a front view of a refrigerator appliance according to an exemplary embodiment of the present subject matter.

Repeat use of reference characters in the present specification and drawings is intended to represent the same or analogous features or elements of the present invention.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the terms "first," "second," and "third" may be used interchangeably to distinguish one component from another and are not intended to signify location or importance of the individual components. The terms "includes" and "including" are intended to be inclusive in a manner similar to the term "comprising." Similarly, the term "or" is generally intended to be inclusive (i.e., "A or B" is intended to mean "A or B or both"). In addition, here and throughout the specification and claims, range limitations may be combined and/or interchanged. Such ranges are identified and include all the sub-ranges contained therein unless context or language indicates otherwise. For example, all ranges disclosed herein are inclusive of the endpoints, and the endpoints are independently combinable with each other. The singular forms "a," "an," and "the" include plural references unless the context clearly dictates otherwise.

Approximating language, as used herein throughout the specification and claims, may be applied to modify any quantitative representation that could permissibly vary without resulting in a change in the basic function to which it is related. Accordingly, a value modified by a term or terms, such as "generally," "about," "approximately," and "substantially," are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a 10 percent margin, i.e., including values within ten percent greater or less than the stated value. In this regard, for example, when used in the context of an angle or direction, such terms include within ten degrees greater or less than the stated angle or direction, e.g., "generally vertical" includes forming an angle of up to ten degrees in any direction, e.g., clockwise or counterclockwise, with the vertical direction V.

The word "exemplary" is used herein to mean "serving as an example, instance, or illustration." In addition, references to "an embodiment" or "one embodiment" does not necessarily refer to the same embodiment, although it may. Any implementation described herein as "exemplary" or "an embodiment" is not necessarily to be construed as preferred or advantageous over other implementations. Moreover, each example is provided by way of explanation of the invention, not limitation of the invention. In fact, it will be apparent to those skilled in the art that various modifications and variations can be made in the present invention without departing from the scope of the invention. For instance, features illustrated or described as part of one embodiment can be used with another embodiment to yield a still further embodiment. Thus, it is intended that the present invention covers such modifications and variations as come within the scope of the appended claims and their equivalents.

Figure 2:
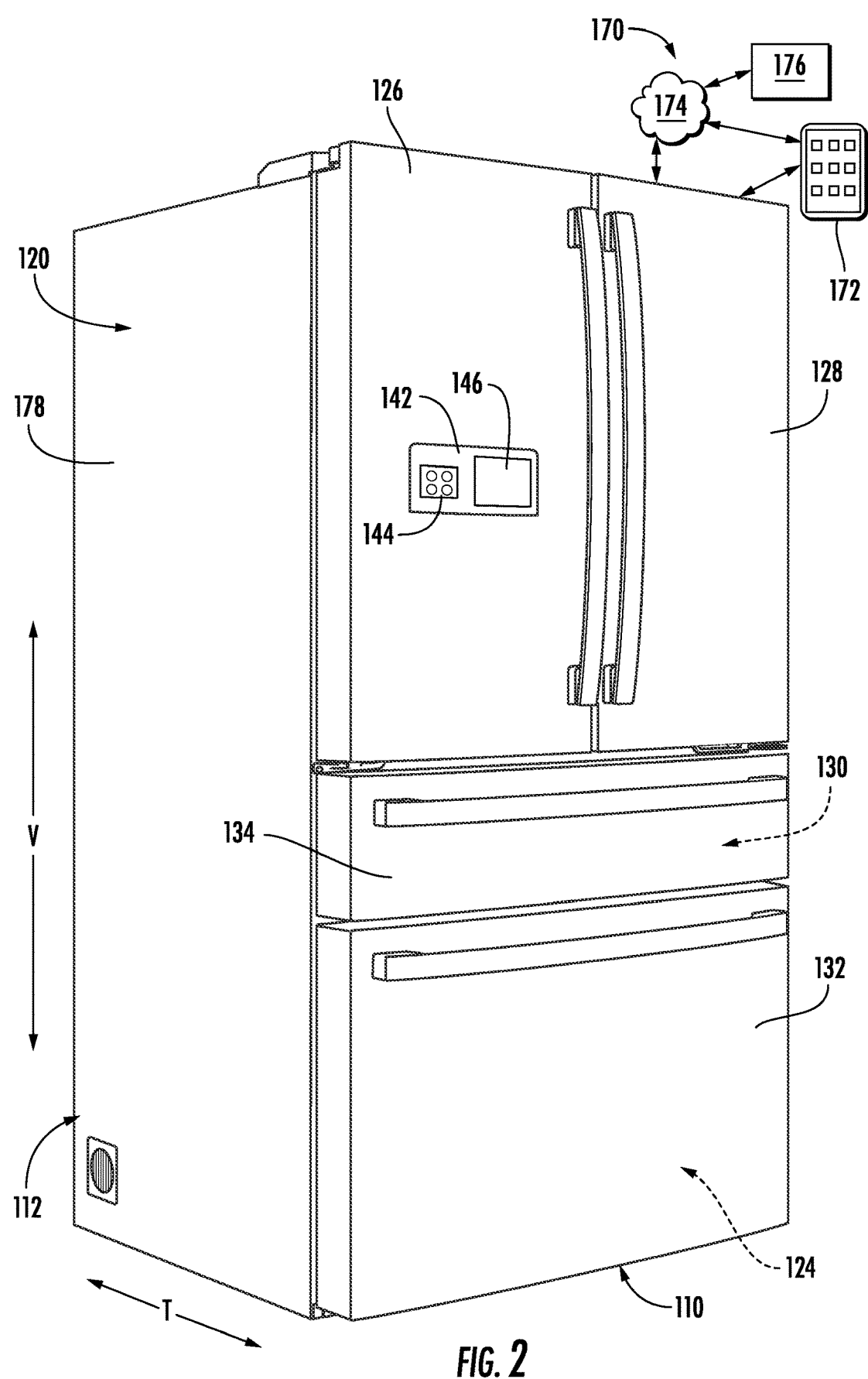
FIG. 2 provides a perspective view of the refrigerator appliance of FIG. 1.
Figure 3:
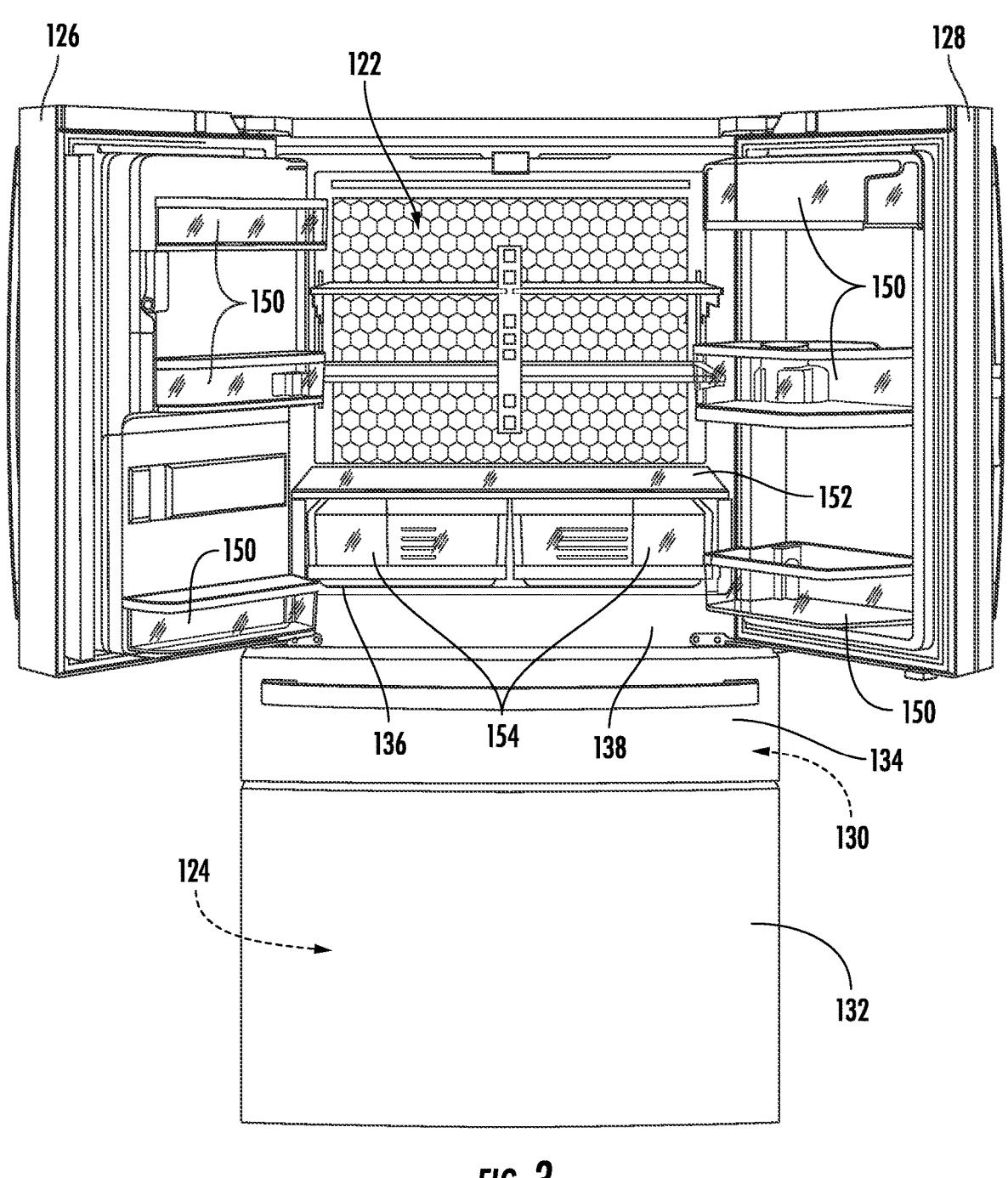
FIG. 3 provides a front view of the refrigerator appliance of FIG. 1 with doors thereof in an open position.

Turning to the figures, FIG. 1 is a front view of an exemplary embodiment of a refrigerator appliance 100. FIG. 2 is a perspective view of the refrigerator appliance 100. FIG. 3 is a front view of the refrigerator appliance 100 with fresh food doors, left door 126 and right door 128 thereof, in an open position. Refrigerator appliance 100 extends between a top 102 and a bottom 104 along a vertical direction V. Refrigerator appliance 100 also extends between a first (left) side 106 and a second (right) side 108 along a lateral direction L. As shown in FIG. 2, a transverse direction T may additionally be defined perpendicular to the vertical and lateral directions V and L. Refrigerator appliance 100 extends along the transverse direction T between a front portion 110 and a back portion 112.

Refrigerator appliance 100 includes a housing or cabinet 120 defining a fresh food chamber 122 and a lower freezer chamber or frozen food storage chamber 124 arranged below the fresh food chamber 122 along the vertical direction V. In some embodiments, an auxiliary food storage chamber 130 may be positioned between the fresh food storage chamber 122 and the frozen food storage chamber 124, e.g., along the vertical direction V. Because the frozen food storage chamber 124 is positioned below the fresh food storage chamber 122, refrigerator appliance 100 is generally referred to as a bottom mount refrigerator. In the exemplary embodiment, cabinet 120 also defines a mechanical compartment (not shown) for receipt of a sealed cooling system (not shown). Using the teachings disclosed herein, one of skill in the art will understand that the present invention can be used with other types of refrigerators (e.g., single door refrigerators or side-by-sides) as well. Consequently, the description set forth herein is for illustrative purposes only and is not intended to limit the invention in any aspect.

Refrigerator doors 126, 128 are each rotatably hinged to an edge of housing 120 for accessing fresh food chamber 122. As illustrated, left door 126 is hinged to an edge of first (left) side wall 178 and right door 128 is hinged to second (right) side wall 180. It should be noted that while two doors 128 in a "French door" configuration are illustrated, any suitable arrangement of doors utilizing one, two, or more doors is within the scope and spirit of the present disclosure. Refrigerator doors 126, 128, when in the closed position of FIG. 1, cooperate with the top wall 182, bottom wall 184, first side wall 178, second side wall 180 and back wall 186 to substantially seal the fresh food storage compartment 122. A freezer door 132 is arranged below refrigerator doors 126, 128 for accessing frozen food chamber 124. In the exemplary embodiment, freezer door 132 is coupled to a freezer drawer (not shown) slidably mounted within frozen food chamber 124. An auxiliary food storage door 134 may be coupled to an auxiliary drawer (not shown) which is slidably mounted within the auxiliary food storage chamber 130.

Operation of the refrigerator appliance 100 can be regulated by a controller 140 that is operatively coupled to at least a user interface panel 142. User interface panel 142 provides user input devices 144 for user manipulation of the operation of refrigerator appliance 100 to modify environmental conditions therein, such as temperature selections, etc. In response to user manipulation of the user input devices 144, the controller 140 operates various components of the refrigerator appliance 100. Operation of the refrigerator appliance 100 can be regulated by the controller 140, e.g., controller 140 may regulate operation of various components of the refrigerator appliance 100 in response to programming and/or user manipulation of the user input devices 144.

The controller 140 may include a memory and one or more microprocessors, CPUs or the like, such as general or special purpose microprocessors operable to execute programming instructions or micro-control code associated with operation of refrigerator appliance 100. The memory may represent random access memory such as DRAM, or read only memory such as ROM or FLASH. In one embodiment, the processor executes programming instructions stored in memory. The memory may be a separate component from the processor or may be included onboard within the processor. It should be noted that controllers 140 as disclosed herein are capable of and may be operable to perform any methods of operating the refrigerator appliance 100 and associated method steps as disclosed herein. As such, controller 140 may be in operable communication with all systems of refrigerator appliance 100, at least user interface panel 142, display 146, and control and operating systems (not shown) for the fresh food storage chamber 122.

The controller 140 may be positioned in a variety of locations throughout refrigerator appliance 100. In the illustrated embodiment, the controller 140 may be located within the door 126. In such an embodiment, input/output ("I/O") signals may be routed between the controller and various operational components of refrigerator appliance 100. In one embodiment, the user interface panel 142 may represent a general purpose I/O ("GPIO") device or functional block. In one embodiment, the user interface panel 142 may include user input devices 144, such as one or more of a variety of electrical, mechanical or electro-mechanical input devices including rotary dials, push buttons, and touch pads. The user interface panel 142 may include a display 146 component, such as a digital or analog display device designed to provide operational feedback to a user by displaying graphic images or textural messages. For example, the user interface panel 142 may include a touchscreen providing both input and display functionality. The user interface panel 142 may be in communication with the controller 140 via one or more signal lines or shared communication busses.

Referring to FIG. 2, a schematic diagram of an external communication system 170 will be described according to an exemplary embodiment of the present subject matter. In general, external communication system 170 is configured for permitting interaction, data transfer, and other communications between refrigerator appliance 100 and one or more external devices. For example, this communication may be used to provide and receive operating parameters, user instructions or notifications, performance characteristics, user preferences, or any other suitable information for improved performance of refrigerator appliance 100. In addition, it should be appreciated that external communication system 170 may be used to transfer data or other information to improve performance of one or more external devices or appliances and/or improve user interaction with such devices.

For example, external communication system 170 permits controller 140 of refrigerator appliance 100 to communicate with a separate device external to appliance 100, referred to generally herein as an external device 172. As described in more detail below, these communications may be facilitated using a wired or wireless connection, such as via a network 174. In general, external device 172 may be any suitable device separate from appliance 100 that is configured to provide and/or receive communications, information, data, or commands from a user. In this regard, external device 172 may be, for example, a personal phone, a smartphone, a tablet, a laptop or personal computer, a wearable device, a smart home system, or another mobile or remote device.

In addition, a remote server 176 may be in communication with appliance 100 and/or external device 172 through network 174. In this regard, for example, remote server 176 may be a cloud-based server 176, and is thus located at a distant location, such as in a separate state, country, etc. According to an exemplary embodiment, external device 172 may communicate with a remote server 176 over network 174, such as the Internet, to transmit/receive data or information, provide user inputs, receive user notifications or instructions, interact with or control refrigerator appliance 100, etc. In addition, external device 172 and remote server 176 may communicate with refrigerator appliance 100 to communicate similar information.

In general, communication between refrigerator appliance 100, external device 172, remote server 176, and/or other user devices or appliances may be carried using any type of wired or wireless connection and using any suitable type of communication network, non-limiting examples of which are provided below. For example, external device 172 may be in direct or indirect communication with appliance 100 through any suitable wired or wireless communication connections or interfaces, such as network 174. For example, network 174 may include one or more of a local area network (LAN), a wide area network (WAN), a personal area network (PAN), the Internet, a cellular network, any other suitable short- or long-range wireless networks, etc. In addition, communications may be transmitted using any suitable communications devices or protocols, such as via Wi-Fi®, Bluetooth®, Zigbee®, wireless radio, laser, infrared, Ethernet type devices and interfaces, etc. In addition, such communication may use a variety of communication protocols (e.g., TCP/IP, HTTP, SMTP, FTP), encodings or formats (e.g., HTML, XML), and/or protection schemes (e.g., VPN, secure HTTP, SSL).

External communication system 170 is described herein according to an exemplary embodiment of the present subject matter. However, it should be appreciated that the exemplary functions and configurations of external communication system 170 provided herein are used only as examples to facilitate description of aspects of the present subject matter. System configurations may vary, other communication devices may be used to communicate directly or indirectly with one or more associated appliances, other communication protocols and steps may be implemented, etc. These variations and modifications are contemplated as within the scope of the present subject matter.

As may be seen in FIG. 3, a plurality of food storage elements, such as bins 150, shelves 152, and drawers 154 are disposed within the fresh food storage chamber 122. As will be described in more detail below, the drawers 154 may be configured for storing produce, i.e., fruits and vegetables. Thus, the drawers 154 may also be referred to as produce drawers 154 or as a vegetable drawer 154 or a fruit drawer 154. For example, in some embodiments, the refrigerator appliance may include two drawers 154, e.g., as illustrated in FIG. 3. As may be seen in FIG. 4, drawer glides 158 (one shown) may be provided to facilitate sliding of the drawers 154 into and out of the fresh food storage chamber 122. The drawer glides 158 are typically used in pairs to at least support the drawer 154 for sliding without any support at the bottom of the drawer. Accordingly, drawer glides 158 may provide a gap 136 between the bottom wall 184 of the fresh food storage chamber 122 and the bottom wall 167 of the bin 150.

Figure 5:
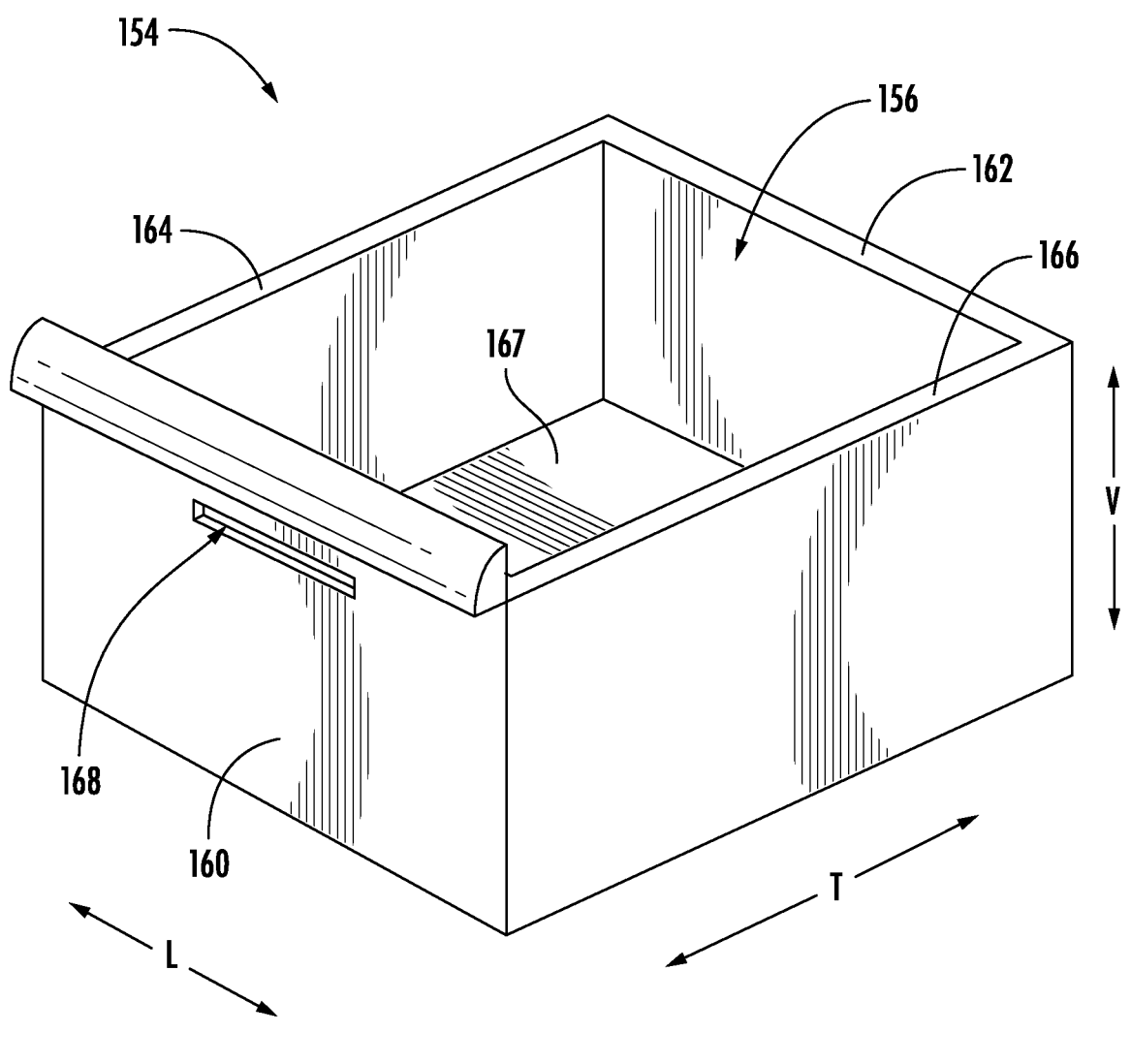
FIG. 5 provides a perspective view of a drawer which may be incorporated into a refrigerator appliance in one or more exemplary embodiments of the present subject matter.

Referring now to FIG. 5, an exemplary drawer 154 may include a fresh food storage volume 156. The fresh food storage volume 156 may be defined by a plurality of walls of the drawer 154. For example, the plurality of walls may include a front wall 160, a back wall 162, a left wall 164, and a right wall 166. Directional terms such as "left" and "right" are used herein with reference to the perspective of a user standing in front of the refrigerator appliance 100 to access items stored therein. One of the walls, e.g., the front wall 160 as in the illustrated example embodiment of FIG. 5, may include one or more vent apertures 168 defined in and through the wall, e.g., the front wall 160.

Figure 4:
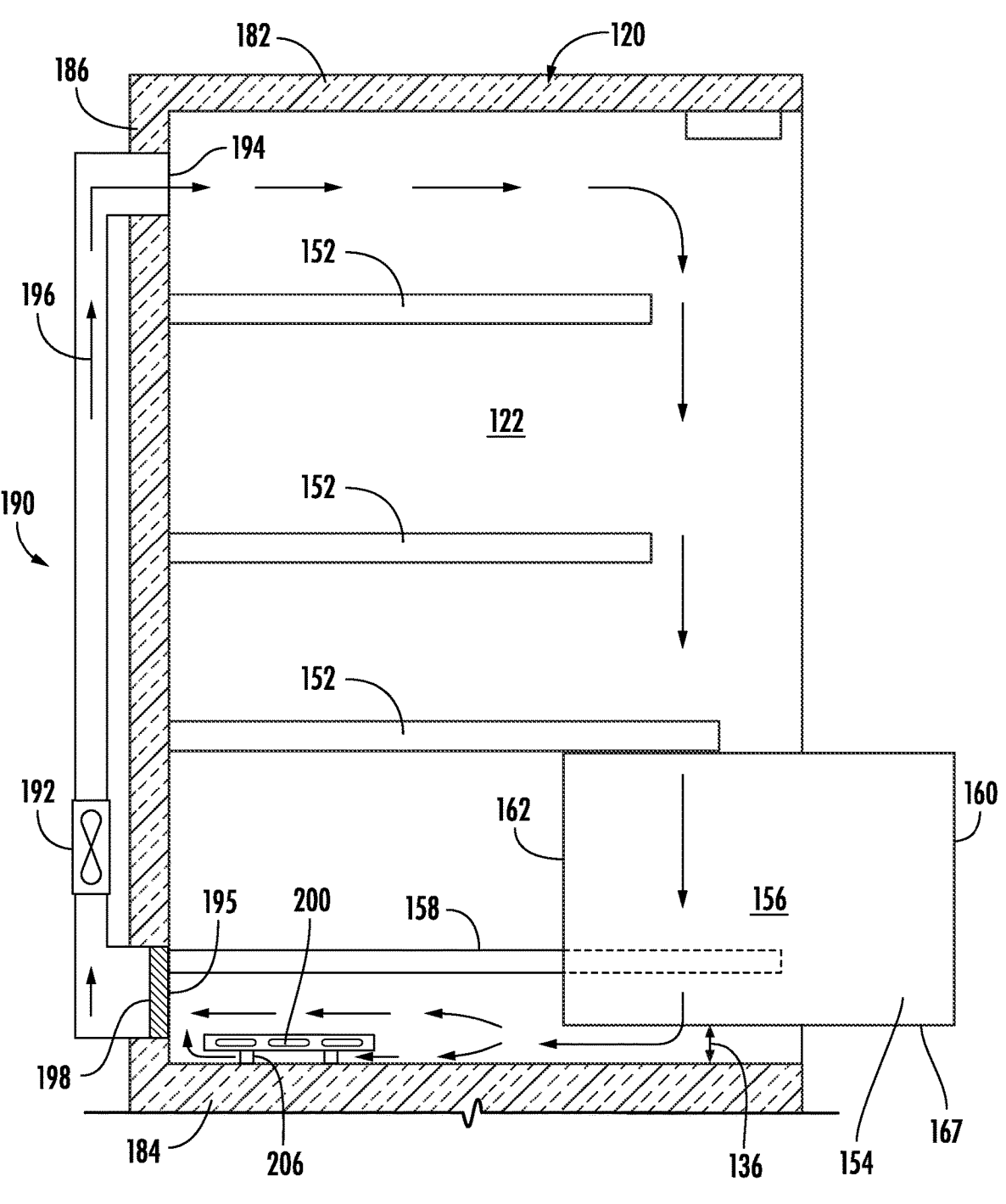
FIG. 4 provides a section view of a portion of the fresh food chamber of the refrigerator appliance according to the present disclosure.

As illustrated in FIG. 4, a fresh food storage chamber ventilation system 190 may be provided according to embodiments of the present disclosure. The ventilation system comprises fan assembly 192 (which may include one or more fan blades, motors, drive systems, etc.) fluidly coupled to a supply vent 194, and return vent 195. The fan assembly is controlled by the controller 140 to selectively urge an air flow along an air flow path (generally illustrated by arrows 196) from the supply vent 194 to the return vent 195. In embodiments, the air flow path includes the interior portions of fresh food storage volume 156 (for example through vent apertures 168) and the gap 136 between the bottom wall 167 of drawer 154 and the bottom wall 184 of fresh food storage chamber 122. As the air flows along flow path 196, the air flow helps distribute chilled air throughout the fresh food storage chamber 122. Additionally, the air flow may pick up volatile gases, such as odors, given off by food stored in the fresh food storage chamber 122. A carbon filter 198, for example a filter comprising activated carbon, may be placed in the air flow path 196 to capture some of the odors.

Other volatile gases may be generated by fresh foods stored in the fresh food storage chamber 122 that are less susceptible to capture by carbon filter media. For example, many ripening fruits and vegetables emit ethylene gas. Ethylene is a plant hormone that initiates and accelerates the ripening of many fruits and vegetables, and ultimately causes over-ripened fruits and vegetables. Left unchecked, the presence of ethylene in the fresh food storage chamber 122 can lead to spoilage.

According to embodiments of the present disclosure, a removable ethylene filter assembly 200 may be placed in the air flow path 196 to capture ethylene in the air flow. Other volatile plant hormones may also be captured from the air flow. An exemplary ethylene filter assembly 200 includes a housing 202 and a chemisorption filter media 204 contained in the housing 202. Filter assembly 200 may be referred to as a chemisorption filter assembly 200, and as such, may remove ethylene and other volatile plant hormones through adsorption. The chemisorption filter media 204 may comprise potassium permanganate (KMnO$_4$), for example potassium permanganate embedded in zeolite granules, and then placed in an air permeable sachet 208. The potassium permanganate, the zeolite, or the potassium permanganate embedded in the zeolite may additionally remove odors from the air flow through one or more of chemisorption and physisorption.

Figure 6:
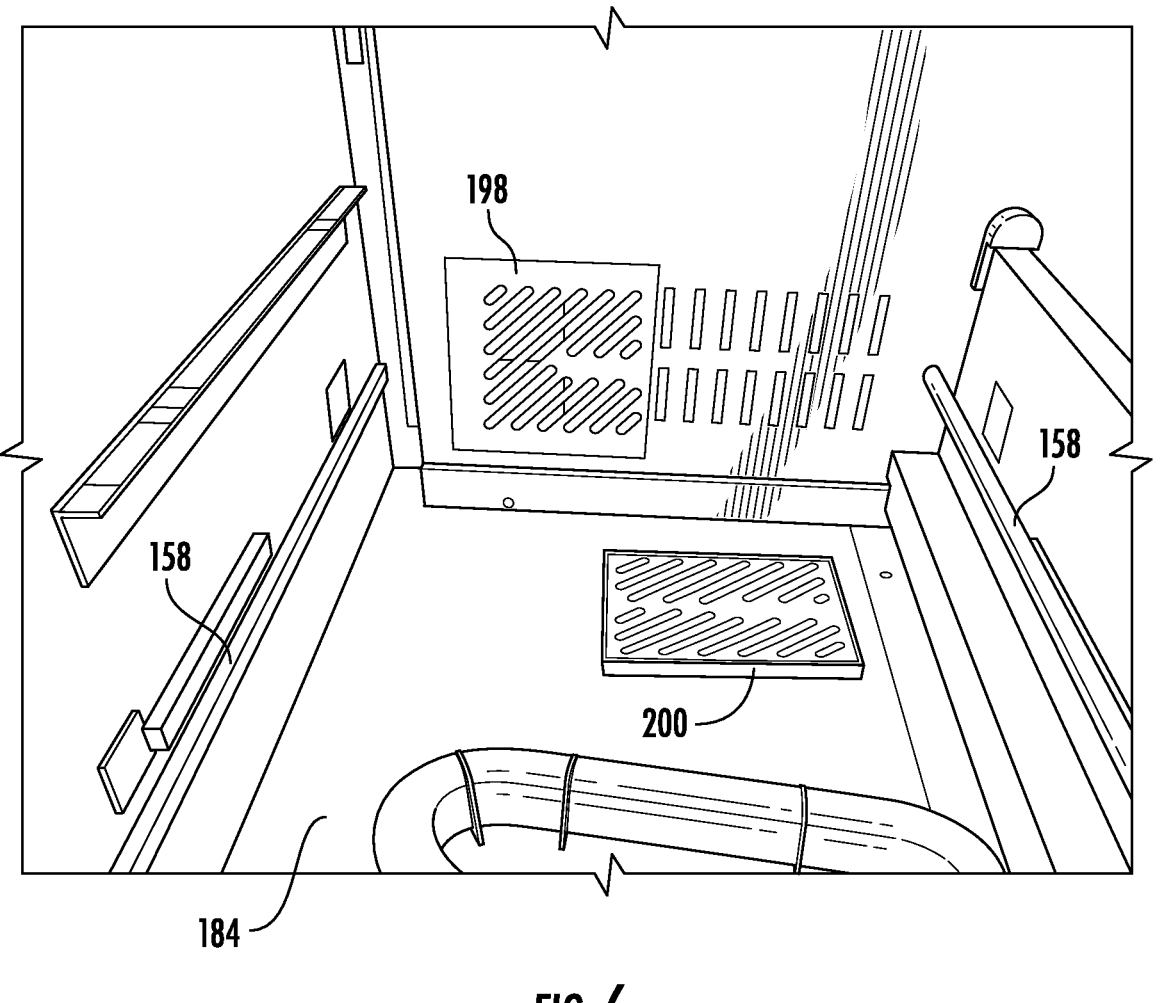
FIG. 6 provides a perspective view of a portion of the interior of the fresh food storage chamber in accordance with an embodiment of the present disclosure.

FIG. 6 is closeup view of the bottom wall 184 of fresh food storage chamber 122 with the left drawer 154 removed. In the illustrated embodiment of FIGS. 4 and 6, the ethylene filter assembly 200 is removably fixed to the bottom wall 184 in the flow path 196, proximate to the carbon filter 198. As shown in FIG. 4, the filter housing 202 includes standoffs 206 to create passageway for a portion of the air flow 196 to pass between the bottom wall 184 and the housing 202 and a portion of the air flow path 196 to pass between the housing 202 and the bottom wall 167 of the drawer 154. In other embodiments, the standoffs may be formed on the bottom wall 184 or may be separate pieces added upon installation of the filter assembly 200.

The housing 202 includes features that facilitate the removal and replacement of the chemisorption filter assembly 200 at the end of the useful life of the chemisorption filter media. In embodiments, the controller 140 may monitor the performance of the filter assembly 200 and provide a replacement filter message, for example on the display 146 or external device 172. For example, the refrigerator appliance 100 may have ethylene sensors in the fresh food storage chamber 122, the sensors in communication with the controller 140. A high level of ethylene determined by the controller from the sensor input may indicate the filter assembly 200 requires replacement and may trigger a replace filter alert. In other case, the controller may monitor the time in service of the filter assembly 200 and, using a predetermined maximum time in service, send a signal to the external device 172 or the display 146, alerting the user that the filter assembly 200 requires replacement. The housing features may cooperate with features on the bottom wall 184 of the fresh food storage chamber 122 to removably fix the filter assembly 200 to the bottom wall 184 in the air flow path 196.

Figure 7:
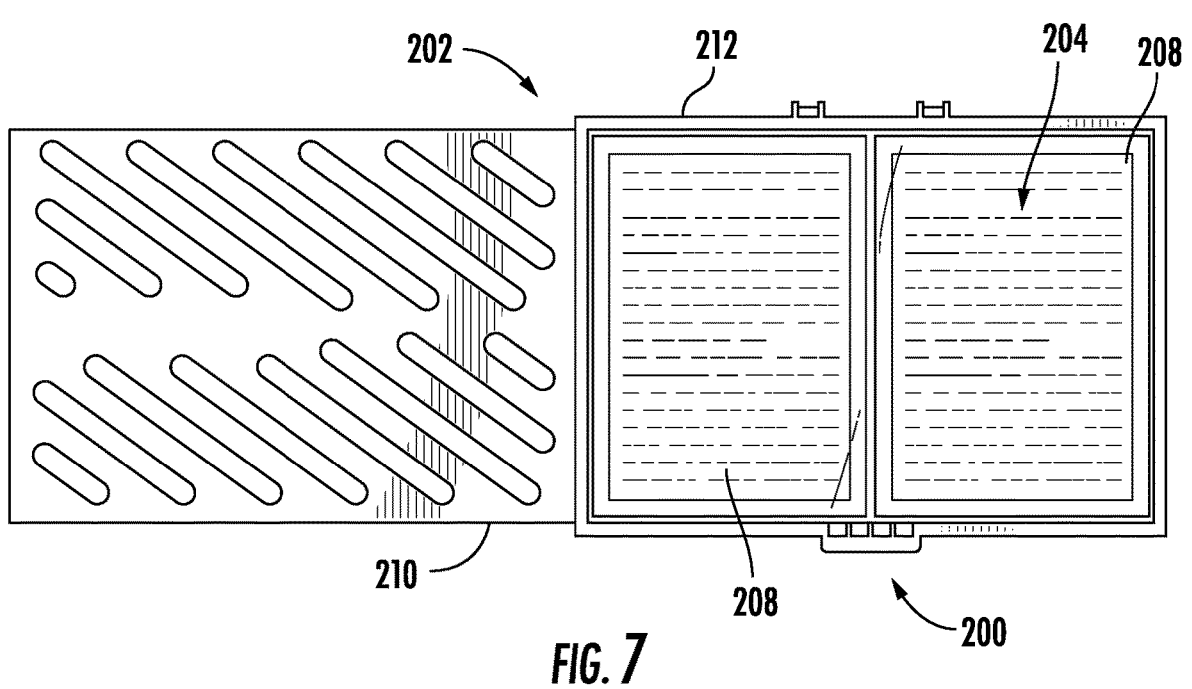
FIG. 7 provides a plan view of a filter assembly with the cover open in accordance with an embodiment of the present disclosure.
Figure 8:
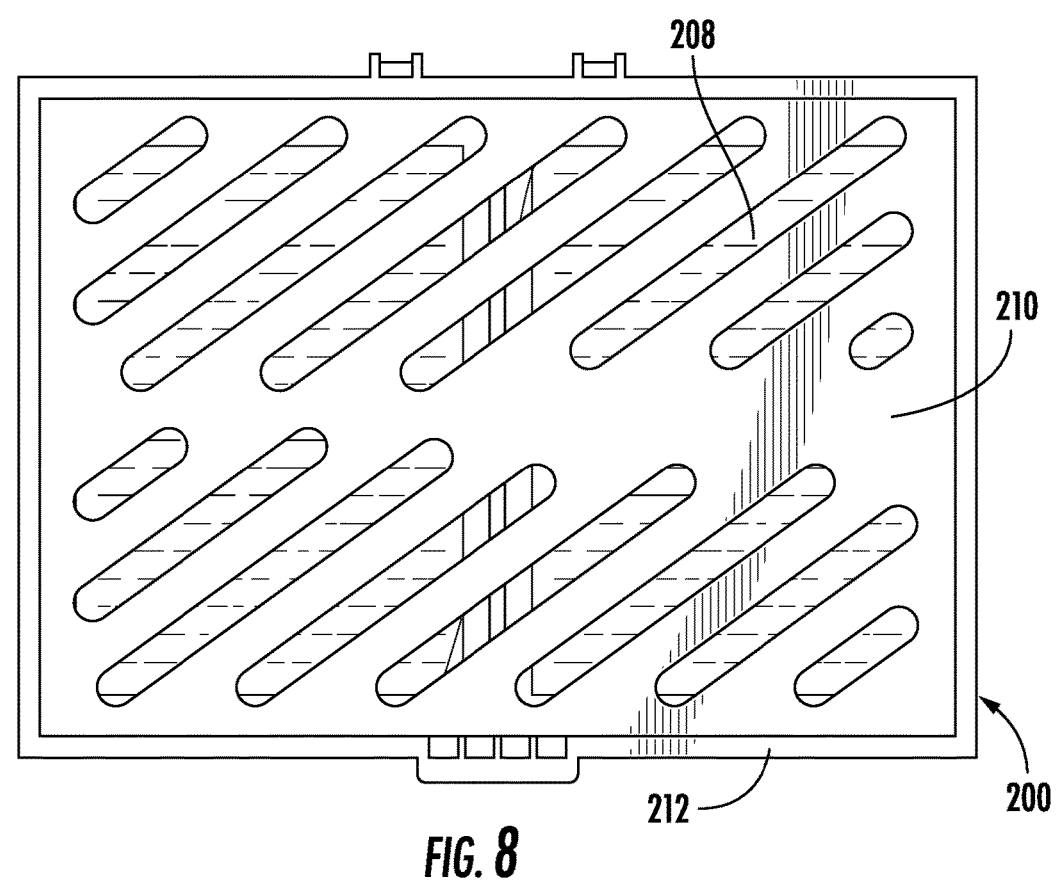
FIG. 8 provides a plane view of the filter assembly of FIG. 7 with the cover closed in accordance with an embodiment of the present disclosure.

FIGS. 7 and 8 illustrate an exemplary chemisorption filter assembly 200. FIG. 7 represents an illustrative chemisorption filter assembly 200 before the cover 210 is sealed to the body 212 (FIG. 8) in a manufacturing step. As provided in the figures, the chemisorption filter media 204 is contained in one or more (2 shown) air permeable sachets 208 and the sachets are placed in body 212 of the housing 202. In some embodiments, the cover 210 and the body 212 are permanently, or substantially permanently, sealed together. For example, the cover 210 and the body 212 may be adhesive bonded or heat sealed together, or joined with tamper resistant elements.

As illustrated, the cover 210 has a series of exemplary perforations to facilitate the air flow reaching the chemisorption filter media 204 in the sachet 208 while obstructing accidental user contact when handling the filter assembly 200. In embodiments, the same or different perforation pattern may be present on the bottom (not shown) of the body 212 or on other portions of the body 212. In general, the housing comprises one or more walls defining a volume, at least some of one or more walls define perforations such that fluid communication is facilitated between the chemisorption filter media 204 and the air flow. The size, shape, and pattern of the exemplary perforations in the illustration is for ease of illustration only. Any perforation pattern that will facilitate the fluid communication may be used within the scope of this disclosure.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

What is claimed is:

1. A refrigerator appliance defining a vertical direction, a lateral direction, and a transverse direction, the vertical, lateral, and transverse directions being mutually perpendicular, the refrigerator appliance comprising:

a cabinet comprising a first side wall laterally spaced from a second side wall, a top wall vertically spaced above a bottom wall, and a back wall, the first side wall, second side wall, top wall, bottom wall, and back wall defining a fresh food storage chamber;

a drawer slidably mounted within the fresh food storage chamber, the drawer comprising a plurality of walls defining a fresh food storage bin, the plurality of walls comprising a bottom wall, wherein the bottom wall of the drawer and the bottom wall of the cabinet define a space therebetween;

a fresh food storage chamber ventilation system comprising a fan assembly fluidly coupled to an air supply vent and an air return vent, wherein the fan assembly urges an air flow along an air flow path from the supply vent to the return vent, wherein the air flow path includes the space between the bottom wall of the drawer and the bottom wall of the cabinet; and a removable air filter assembly comprising a housing and a chemisorption filter media contained in the housing, the filter assembly removably attached in the air flow path, wherein the filter assembly is spaced from the bottom wall of the cabinet such that a portion of the air flow passes between the housing and the bottom wall and a portion of the air flow passes between the housing and the drawer.

2. The refrigerator appliance of claim 1, wherein the air flow path includes the fresh food storage bin.

3. The refrigerator appliance of claim 1, wherein the filter assembly is removably attached to the bottom wall of the cabinet in the air flow path.

4. The refrigerator appliance of claim 1, wherein the chemisorption filter media removes one or more plant hormones from the air flow.

5. The refrigerator appliance of claim 4, wherein the chemisorption filter media removes at least one of the one or more plant hormones from the air flow through adsorption.

6. The refrigerator appliance of claim 4, wherein the chemisorption filter media removes ethylene.

7. The refrigerator appliance of claim 4, wherein the chemisorption filter media comprises potassium permanganate.

8. The refrigerator appliance of claim 7, wherein the potassium permanganate is embedded in zeolite.

9. The refrigerator appliance of claim 8, wherein the chemisorption filter media removes odors through one or more of chemisorption and physisorption.

10. The refrigerator appliance of claim 4, wherein the chemisorption filter media is contained within an air permeable sachet within the housing.

11. The refrigerator appliance of claim 10, wherein the chemisorption filter media is contained within the housing.

12. The refrigerator appliance of claim 1, wherein the housing comprises one or more walls, at least some of the walls defining perforations such that fluid communication is facilitated between the chemisorption filter media and the air flow.

13. The refrigerator appliance of claim 1, wherein the filter assembly is removably attached in the air flow path and positioned closer to the return vent than a front wall of the cabinet.

* * * * *